United States Patent
Beddus et al.

(10) Patent No.: US 11,206,260 B2
(45) Date of Patent: Dec. 21, 2021

(54) AUTHENTICATION OF DATA TRANSMISSION DEVICES

(71) Applicant: BRITISH TELECOMMUNICATIONS PUBLIC LIMITED COMPANY, London (GB)

(72) Inventors: Simon Beddus, London (GB); Paul Deans, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/067,203

(22) PCT Filed: Jan. 5, 2017

(86) PCT No.: PCT/EP2017/050233
§ 371 (c)(1),
(2) Date: Jun. 29, 2018

(87) PCT Pub. No.: WO2017/125265
PCT Pub. Date: Jul. 27, 2017

(65) Prior Publication Data
US 2019/0014114 A1    Jan. 10, 2019

(30) Foreign Application Priority Data

Jan. 19, 2016  (EP) .................... 16151941

(51) Int. Cl.
*H04L 29/06* (2006.01)
*H04W 12/06* (2021.01)
(Continued)

(52) U.S. Cl.
CPC ........ *H04L 63/0884* (2013.01); *H04L 9/0819* (2013.01); *H04L 9/3228* (2013.01);
(Continued)

(58) Field of Classification Search
CPC ............ H04L 63/0884; H04L 63/0838; H04L 9/3273; H04L 9/3228; H04L 9/0819;
(Continued)

(56) References Cited

U.S. PATENT DOCUMENTS 7,649,884 B1 * 1/2010 Ahmed ............... H04L 12/1877
370/254
9,154,488 B2 * 10/2015 Innes .................. H04L 63/0884
(Continued)

FOREIGN PATENT DOCUMENTS

| EP | 2 466 791 | 6/2012 |
| WO | 03/003690 | 1/2003 |

(Continued)

OTHER PUBLICATIONS

Val, Pablo Basanta; Valls, Marisol Garcia; Cunado, Miguel Baza; "A Simple Data-Muling Protocol", Transactions on Industrial Informatics, IEEE, vol. 10, Issue 2, Nov. 14, 2013, pp. 895-902.*

(Continued)

*Primary Examiner* — Victor Lesniewski
(74) *Attorney, Agent, or Firm* — Nixon & Vanderhye P.C.

(57) ABSTRACT

An intermediate data transmission device arranges for mutual authentication between itself and a remote terminal to allow data to be exchanged between the remote terminal and a server through the device. The server sends first and second key codes to the intermediate device, the key codes both being derived from a shared secret known to the server and remote terminal but not to the intermediate device. In response to a challenge from the intermediate device the remote terminal uses the shared secret to generate a duplicate of the first key code and transmits the duplicate to the intermediate device. The intermediate device compares the first key code and the duplicate of the first key code received respectively from the server and the remote terminal to
(Continued)

verify the authenticity of the remote terminal. The intermediate device then transmits the second key code to the remote terminal, to be compared by the remote terminal with a duplicate of the second key code to verify the authenticity of the intermediate device. This process allows the intermediate device to be used without itself having the shared secret. The codes generated by the server may be encoded with a network identity of the intermediate device using the shared secret, such that the remote terminal can only respond to the same intermediate device that transmitted the codes. This prevents a "man-in-the middle" attack by another intermediate device, as without the shared secret no intermediate device can modify the codes to include a different network identity.

26 Claims, 7 Drawing Sheets (51) Int. Cl.
*H04W 12/069* (2021.01)
*H04L 9/32* (2006.01)
*H04L 9/08* (2006.01)
*H04W 88/04* (2009.01)

(52) U.S. Cl.
CPC .......... *H04L 9/3271* (2013.01); *H04L 9/3273* (2013.01); *H04L 63/0838* (2013.01); *H04W 12/06* (2013.01); *H04W 12/068* (2021.01); *H04W 12/069* (2021.01); *H04W 88/04* (2013.01)

(58) Field of Classification Search
CPC .. H04L 9/3271; H04W 12/06; H04W 12/068; H04W 12/069; H04W 88/04
See application file for complete search history.

(56) References Cited

U.S. PATENT DOCUMENTS

| 10,073,449 | B1* | 9/2018 | Sait | H04L 67/12 |
| 2007/0180499 | A1* | 8/2007 | Van Bemmel | H04L 61/2015 726/4 |
| 2008/0313719 | A1* | 12/2008 | Kaliski, Jr. | H04L 63/0815 726/5 |
| 2009/0310561 | A1 | 12/2009 | Grob et al. | |
| 2010/0039317 | A1* | 2/2010 | Cameron | G06Q 10/08 342/357.52 |
| 2010/0103851 | A1* | 4/2010 | Chintada | H04W 88/04 370/312 |
| 2012/0093087 | A1* | 4/2012 | Chen | H04L 45/025 370/328 |
| 2012/0221473 | A1* | 8/2012 | Redmann | G06Q 30/06 705/5 |
| 2014/0095864 | A1* | 4/2014 | Dasgupta | H04L 45/64 713/155 |
| 2014/0212142 | A1* | 7/2014 | Doniec | H04B 10/80 398/104 |
| 2015/0130630 | A1* | 5/2015 | Outwater | G01D 4/006 340/870.02 |
| 2015/0222439 | A1* | 8/2015 | Bhattacharya | H04L 67/12 713/169 |
| 2015/0281175 | A1* | 10/2015 | Basalamah | H04L 61/35 370/241 |
| 2016/0182499 | A1* | 6/2016 | Sharaga | H04L 63/0823 713/156 |

FOREIGN PATENT DOCUMENTS

| WO | 2015/097223 | | 7/2015 |
| WO | 2015/097223 | A1 | 7/2015 |
| WO | 2015/166099 | | 11/2015 |

OTHER PUBLICATIONS

Anastasi, Giuseppe; Conti, Marco; Di Francesco, Mario; "Data Collection in Sensor Networks with Data Mules: an Integrated Simulation Analysis", Symposium on Computers and Communications, IEEE, Jul. 6-9, 2008, pp. 1096-1102.*

Shah, Rahul C.; Roy, Sumit; Jain, Sushant; Brunette, Waylon; "Data MULEs: Modeling a Three-tier Architecture for Sparse Sensor Networks", Proceedings of the First IEEE International Workshop on Sensor Network Protocols and Applications, IEEE, May 11, 2003, pp. 30-41.*

International Search Report for PCT/EP2017/050233 dated Mar. 3, 2017, 3 pages.

"Digital cellular telecommunications system (Phase 2+); Universal Mobile Telecommunications System (UMTS); 3G security; Security architecture (3GPP TS 33.102 version 12.2.0 Release 12)", Technical Specification, European Telecommunications Standards Institute (ETSI), 650, Route Des Lucioles; F-06921 Sophia-Antipolis; France, vol. 3GPP SA 3, No. V12.2.0, Jan. 1, 2015 (Jan. 1, 2015), XP014235393.

Examination Report dated Jul. 31, 2019 for GB application No. GB1600958.1 (3 pgs.).

* cited by examiner

AUTHENTICATION OF DATA TRANSMISSION DEVICES

This application is the U.S. national phase of International Application No. PCT/EP2017/050233 filed Jan. 5, 2017 which designated the U.S. and claims priority to EP Patent Application No. 16151941.8 filed Jan. 19, 2016, the entire contents of each of which are hereby incorporated by reference.

BACKGROUND AND SUMMARY

This invention relates to the authentication of communications connections between servers and remote terminals using intermediate "mule" devices. It is particularly suited to the use of programmable wireless devices such as smart phones to collect or relay data from isolated Wireless Sensor Networks (WSNs) in a secure manner.

Mobile AdHoc-Networks or MANets have been developed and used for communication and instrumentation across battlefield, disaster area and agricultural situations where existing network capability is absent or at best intermittent. Innovative approaches have been developed to store critical data collected by sensors and forward it during brief moments of network capacity. Although network connectivity is almost ubiquitous, there are network, power and financial budgetary constraints that mean it is not possible for each remote terminal to have its own 4G wireless card and suitable battery supply to "backhaul" the data to a central data hub.

Even in urban situations, accessing suitable WiFi-capable backhaul continues to be a major obstacle to mass deployment of sensors. To address this need the concept of the data "mule" has been developed, a mobile collector or distributor device that moves through a field of interest, establishing intermittent contact with individual remote terminals, and collecting data from them for onward transmission to a central server (or, conversely, as a distributor to the remote terminals of data that has previously been downloaded to the device from a central server). Deployments typically include attachment of data mules to vehicles such as buses that collect data from roadside sensors along the route. Another application is the collection of domestic utility meter readings (water, electricity, gas, etc) by providing each premises' meter with a low-range wireless transmitter which can be read by a "mule" in a vehicle operated by the utility company as it passes through the area. The term "sensor" used in this specification includes utility meters, and any other devices which record measurements or responses to external stimuli and store the data for subsequent download.

Unlike conventional relays, the mules do not need to be in simultaneous communication with the transmitter of the data and the receiver of the destination of the data, but can store the data whilst moving out of the range of the source transmitter to the range of the receiver, through a zone out of range of both. However, this means that the source and destination cannot mutually authenticate each other's credentials.

The "mules" do not need to have access to the data they convey, but each of the three parties (server, remote terminal (sensor) and mobile device or "mule") have to be able to authenticate to the other two that the connection between them is genuine. Existing data mule deployments are closed systems whereby the data mule and sensor network are owned and operated by the same legal entity. In such a situation, security credentials can be distributed across the closed system with a reduced risk that the information will be exposed. The data mule stores usernames, passwords or access keys that can be presented to WSN nodes during an authentication process. This approach requires very tight access to credential management. In particular, the devices to be used as mules have the access credentials of the WSN, and this requires that such devices are strictly controlled by the operator of the WSN. For instance, several mules could in principle use the same credentials, as those credentials will be transferred by the owner to each mule under strict secure conditions with very little chance of interception.

These closed systems require a dedicated fleet of mule devices and personnel to operate them. It is desirable to allow any suitably programmable communications device such as a "smartphone" to act as a data mule without a pre-established relationship with multiple WSNs. This expands the number of devices that can be used, and thus improves the data collection process. The necessary programming application (referred to herein as a DMA—data mule application), is relatively simple to install either on manufacture, or by downloading to the device subsequently, and could be installed in any Smartphone whose owner is willing to allow the device to be used in this way. Ideally the use as a "mule" would be transparent to the user and only make use of spare capacity, for example when the device is in idle mode. As with the conventional data mules, interaction with the sensor terminals may be limited to times when the mule and sensor are in close proximity, and upload of the data arranged to be at a later time when the device is in contact with the network, thus minimising the power required to operate the mule functions.

However, it is not desirable to allow a device that is not under the control of the WSN operator to be entrusted with the authentication data required for the sensors to communicate with the central data collecting server. To do so would risk compromising the security of the system as the number of such devices would proliferate. If the credentials were simply copied to thousands of third party mules under less than perfect conditions, this could result in a compromised mule (outside the control of the WSN owner) discovering and exposing the credentials to the world. The present invention addresses this problem, by providing a method for authentication of a communications connection between a server and a remote terminal using an intermediate device, in which:

the server generates first and second key codes, the key codes both being derived from a shared secret known to the server and remote terminal but not to the intermediate device, the server transmits the first and second key codes to the intermediate device the remote terminal uses the shared secret to generate a duplicate of the first key code, the remote terminal transmits the first key code to the intermediate device the intermediate device compares the first key code and the duplicate of the first key code to verify the authenticity of the remote terminal the intermediate device transmits the second key code to the remote terminal the remote terminal uses the shared secret to generate a duplicate of the second key code the remote terminal compares the second key code and the duplicate of the second key code to verify the authenticity of the intermediate device.

The first and second key codes may be generated dynamically from the shared secret, and changed after each use. In one variant, the server generates a plurality of one-use key code pairs and transmit them to the intermediate device, and the intermediate device uses each key-code pair in turn for a series of authentication interactions with the remote terminal. A key code may be combined with address data of the intermediate device encoded using the shared secret, so that the remote terminal may use the shared secret to decode the address data, so that another intermediate device, with a different address, cannot make connection by using the same key codes The intermediate device may be responsive to a flag signal generated by the remote terminal to route the received data either to a data store in the intermediate device for later transmission to the server, in response to a first setting of the flag signal, or to open a connection to the server for relaying the data to the server in response to a second setting of the flag signal.

The invention also provides, in a data communications network, one or more first data communications devices for transmitting data to a server, and a second data communication device configured to operate as an intermediate relay between such a server and the one or more first data communications devices, which in combination can be configured to operate the method of the invention, and a computer program element comprising computer program code to, when loaded into a communications device and executed thereon, configure the communications device to operate in accordance with the method.

For the avoidance of doubt, it should be understood that the order of the two authentication stages can be reversed from that listed above, so that the first device verifies the authenticity of the second, intermediate, device before the second, intermediate, device verifies the authenticity of the first device.

According to this process, the application (DMA) operating on the device which is to operate as a "mule" (or relay) downloads limited authentication data from a Central Server for one or more local WSNs. The identity of the WSNs for which the device currently requires authentication data can be determined by the central server by reference to location positioning technology installed in the mobile device, such as GPS, or by the identity of the currently serving cellular network base station. The data may be arranged to be deleted from the device after a predetermined period of non-use, both for security and to avoid wasting data storage capacity in the mobile device.

When the device subsequently comes into proximity of one of the WSN terminal nodes for which it has the authentication data the DMA challenges the terminal node and, if the node returns the required response, the DMA is then required to respond to a challenge issued by the node. If the expected authentication details match those expected by the terminal node, data will be uploaded to the DMA for forwarding to the central server. However, the DMA is arranged such that it can only issue the correct challenge and recognise the required response, and return the required response to the challenge issued by the terminal node, because it has been given that information by the central server. The challenge and response are generated using "shared secrets", shared between the central server and the respective terminal node but not the DMA. The server provides sufficient information to the DMA device to be able to issue and recognise the correct challenges and responses, but not to generate them independently of the server.

In a preferred embodiment, the challenges and responses are dynamically generated according to an algorithm derived from the shared secret, so that any rogue device that intercepts the challenge and response data cannot use it subsequently to intercept transmissions from the terminals. The preferred embodiment also encodes the address data of the mule device in communication with the terminal device, to prevent interception of the data by other devices The data mule therefore presents authentication data to the terminal to prove that it is itself authenticated by the Central Server. In a preferred arrangement the DMA uses a network address of the mobile device as part of the encrypted "key" it uses. The terminal node uses a local algorithm to determine whether the presented "key" and mule address are consistent with a device authorised by the central server to act as a data mule in this way. The use of the MAC address (or similar network address) of the mule as part of the encrypted key means that other devices cannot emulate the genuine "mule" device as any response would only be sent to the device with the correct MAC address.

The authentication between the mule and the terminal device can be done without either of them being currently in direct contact with the central server. It is only necessary that the mule will have previously been given the necessary data to carry out the authentication when it subsequently detects a terminal device and the remote terminal will have previously been given the shared secret.

BRIEF DESCRIPTION OF THE DRAWINGS

An exemplary embodiment of the invention will now be described with reference to the drawings, in which.

DETAILED DESCRIPTION OF PRESENT EXAMPLE EMBODIMENTS

Figure 1:
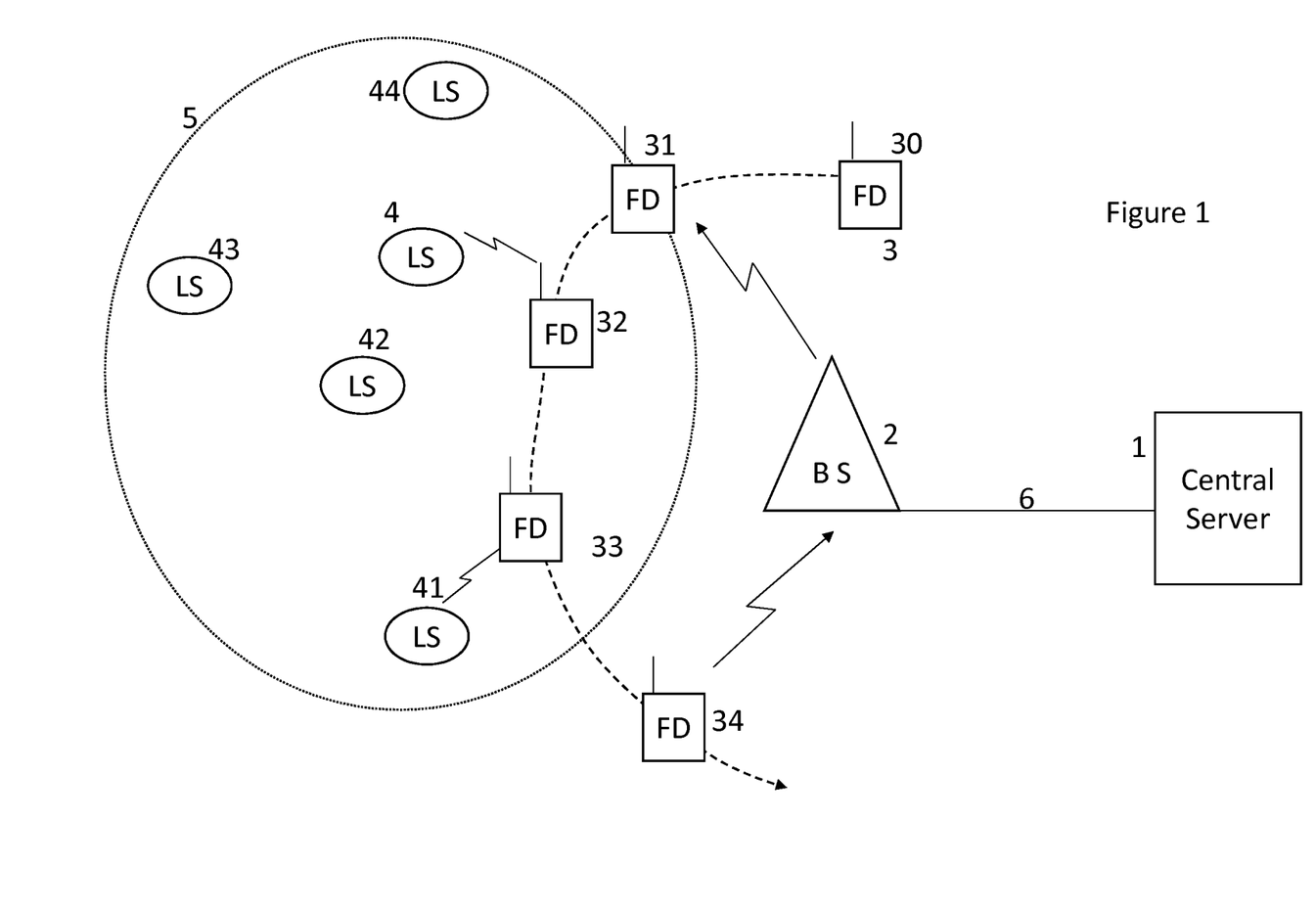
FIG. 1 is a diagrammatic representation of a network in which the invention may operate.
Figure 8:
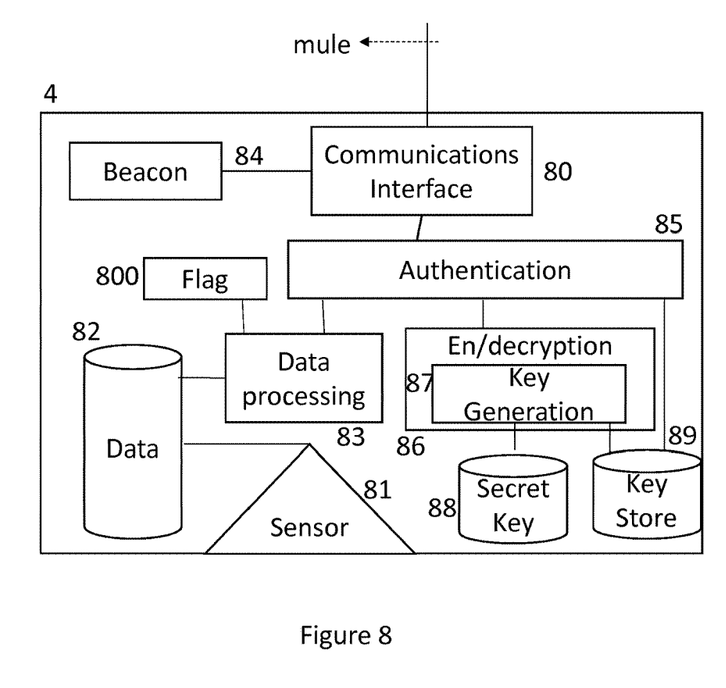
FIG. 8 is a schematic diagram of the functional elements of a central server configured for operation according to the invention.

As depicted in FIG. 1, a number of local terminals 4, 41, 42, 43, 44 are distributed through a region 5. The functional elements of one such terminal 4 are depicted in FIG. 8. These terminals are provided to collect data relating to their environment through sensing apparatus 81, to be stored locally (store 82) and later delivered by a processing system 83 to a server 1 by way of an intermediate device 3 and a communications network 6. A flag function 800 may be used to provide labelling of the data to facilitate handling by the intermediate mobile device 3. Only elements relevant to the understanding of the operation of the embodiment are depicted, but it will be understood that functions such as power management would also be required.

Referring to FIG. 8 in more detail, each terminal is provided with a low-powered radio transceiver 80 which allows it to communicate with devices nearby, but is not powerful enough to communicate directly with the nearest wireless network access point 2. Each terminal also has a beacon generation system 84 for generating a low-powered signal advertising its presence through the radio transceiver (communications interface) 80, either continuously or in response to a signal broadcast by another device such as the mobile device 3. The terminal device 4 also includes an authentication system 85, including an encryption system 86 including a key generation process 87 making use of a "shared secret" key stored in a memory 88. The "shared secret" key can be installed in the terminal when it is first deployed. The terminals are configured to operate in accordance with steps 106-109 and 112-118 of the process to be described later, with reference to FIG. 5.

Figure 4:
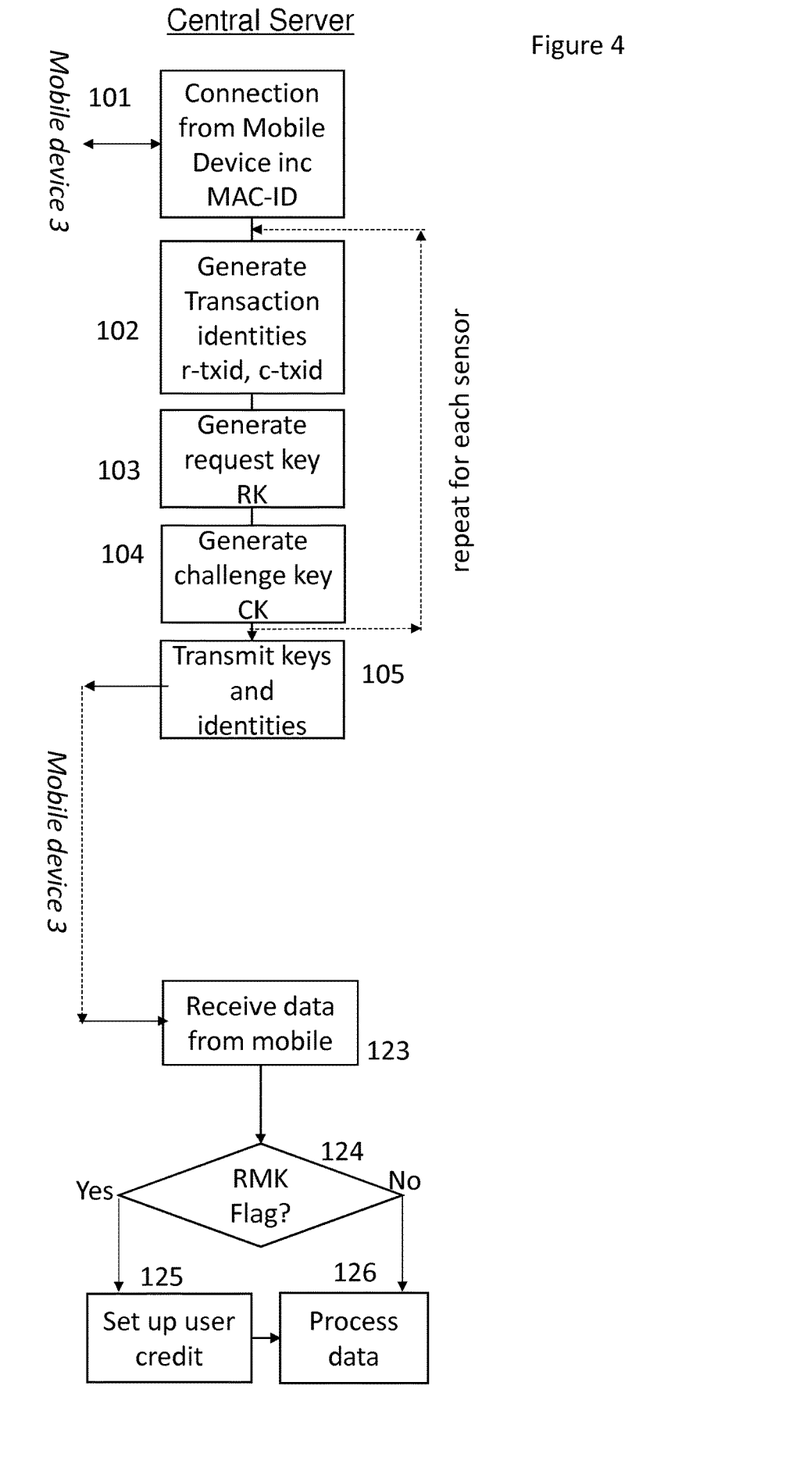
FIG. 4 is a flow chart representing the processes taking place in a central server operating according to the embodiment

The central server 1 depicted in FIG. 6 has a processor 66 configured to operate in accordance with steps 101-105 and 123-126 of the process to be described later, with reference in particular to FIG. 4, and in particular to collect data from the terminals (step 123) and process the data so collected (step 126). It also has a copy of the "shared secret" key 88 for each terminal 4, 40, 41 etc, to be used by a key generation system 62 to generate request keys and challenge keys to be stored (store 63) for use in a decryption function 65 of data received from the remote terminals, 4, 40, 41 etc through the interface 64 from the network 6. As will be explained, the key store also generates key codes for transmission through the communications interface 64 to the mobile devices 3. The central server also maintains a store 68 of location data for the terminals 4, 40, 41 etc.

Figure 6:
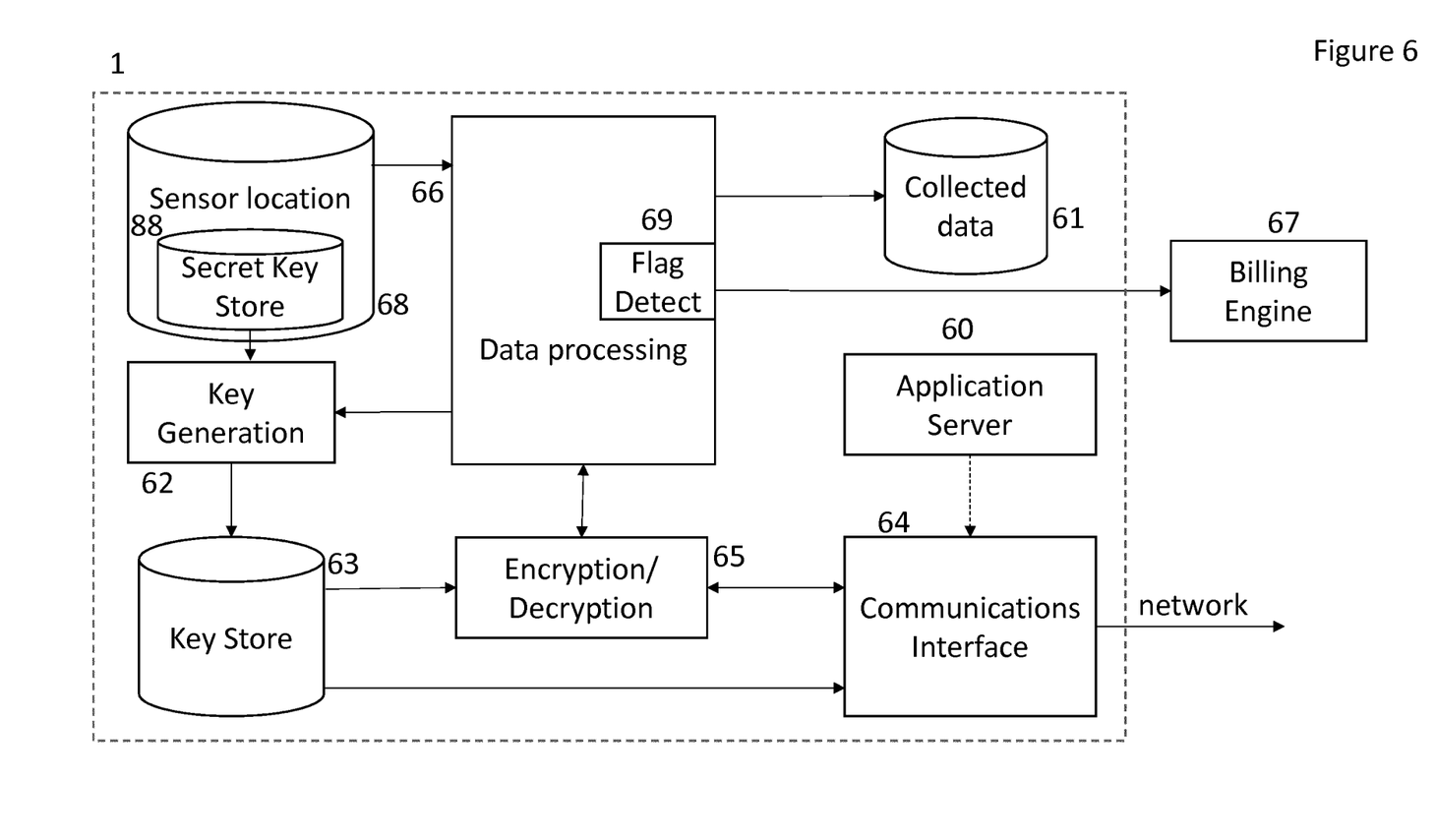
FIG. 6 is a schematic diagram of the functional elements of a terminal configured for operation according to the invention

FIG. 6 depicts an interface 69 with a billing system 67 for managing a user account associated with each mobile device 3, which is used in some embodiments.

The various functional elements depicted in FIG. 6 as co-operating in operation as the server may form part of a distributed system, and are not necessarily co-located.

Figure 3:
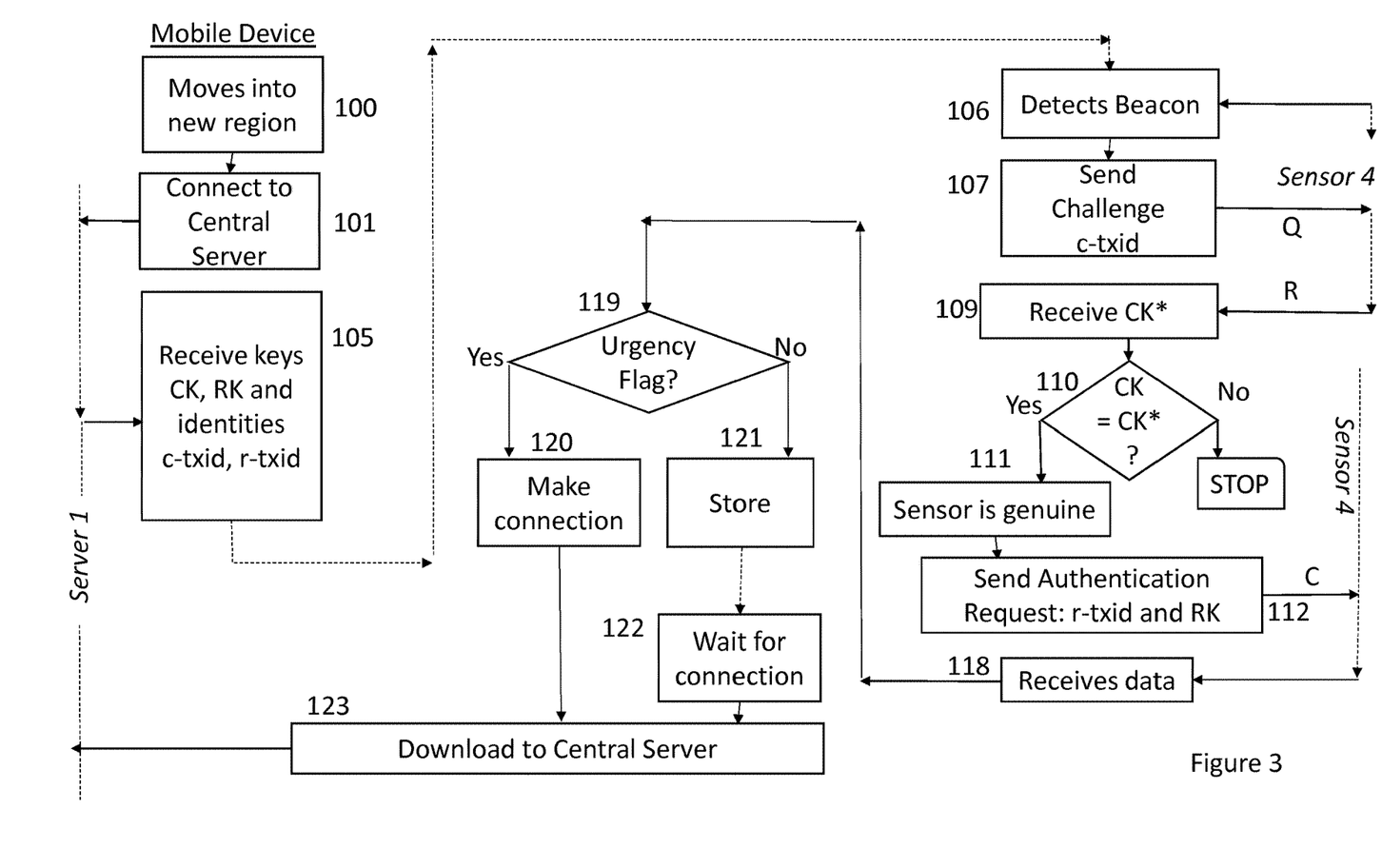
FIG. 3 is a flow chart representing the processes taking place in a mobile device operating according to the embodiment

A "Data Mule Application" (DMA) is installed on a mobile device 3 to allow it to act as a relay between the terminals 4, 41, 42 etc and the central server 1, when the mobile device is within range of one of the terminals, in accordance with steps 100, 101, 105-107, 109-112 and 118-123 of the process, to be described later with reference to FIG. 3. The mobile device may be a conventional "smartphone", with the typical components including a user interface 74, central processor 73, an app store 70 for programming data, and a communications interface 71. The communications interface 71 is capable of wireless communication with the network 2 and the terminal devices 4.

The "data mule application" can be installed in the application store 70 on the device during manufacture, or downloaded subsequently by the central server 1 from an application store 60, (as shown in FIG. 6), or from some other source. The "data mule application" stored in the application store 70 is then used to control the central processor 73 of the mobile device 3 according to the programme data in the application to retrieve data from, or send configuration data to, the terminals 4, 40, . . . , either to forward directly to the server 1 or to store in a temporary data store 78 until it is possible to forward it to the server 1.

The application includes a location-finding system 72 for identifying the general area in which the mobile device 3 is currently located. The location-finding system may use an input from, for example, a GPS system, or it may be associated with the communications interface 71, reporting its position to the server 1 with reference to its location relative to the fixed infrastructure of the network 2. The application also includes a beacon detection function 75 and an authentication processor 76, including a store 77 for downloaded authorisation data.

Such a mobile device 3 is depicted in FIG. 1 travelling on a trajectory 30, 31, 32, 33, 34 which passes through the region 5 in which the terminals are located. As the device approaches the region (position 31), it provides location data (72) to the server 1 which retrieves data 68 relating to any terminals 4, 41, 42 . . . in that area and the key generation system 62 generates authentication data relating to those terminals and transmits it via the interface 64, 2, 71 to the data store 77 associated with the authentication processor 76 running on the processor 73 of the mobile device 3. A flag detector 700 may be provided to process control information relating to the handling of the data, for example whether to forward it immediately or store it in local memory 78 until the device next connects to the network 2. The use of such a flag is particularly useful if the data itself is encrypted in such a way that the mobile device 3 cannot parse it.

Figure 2:
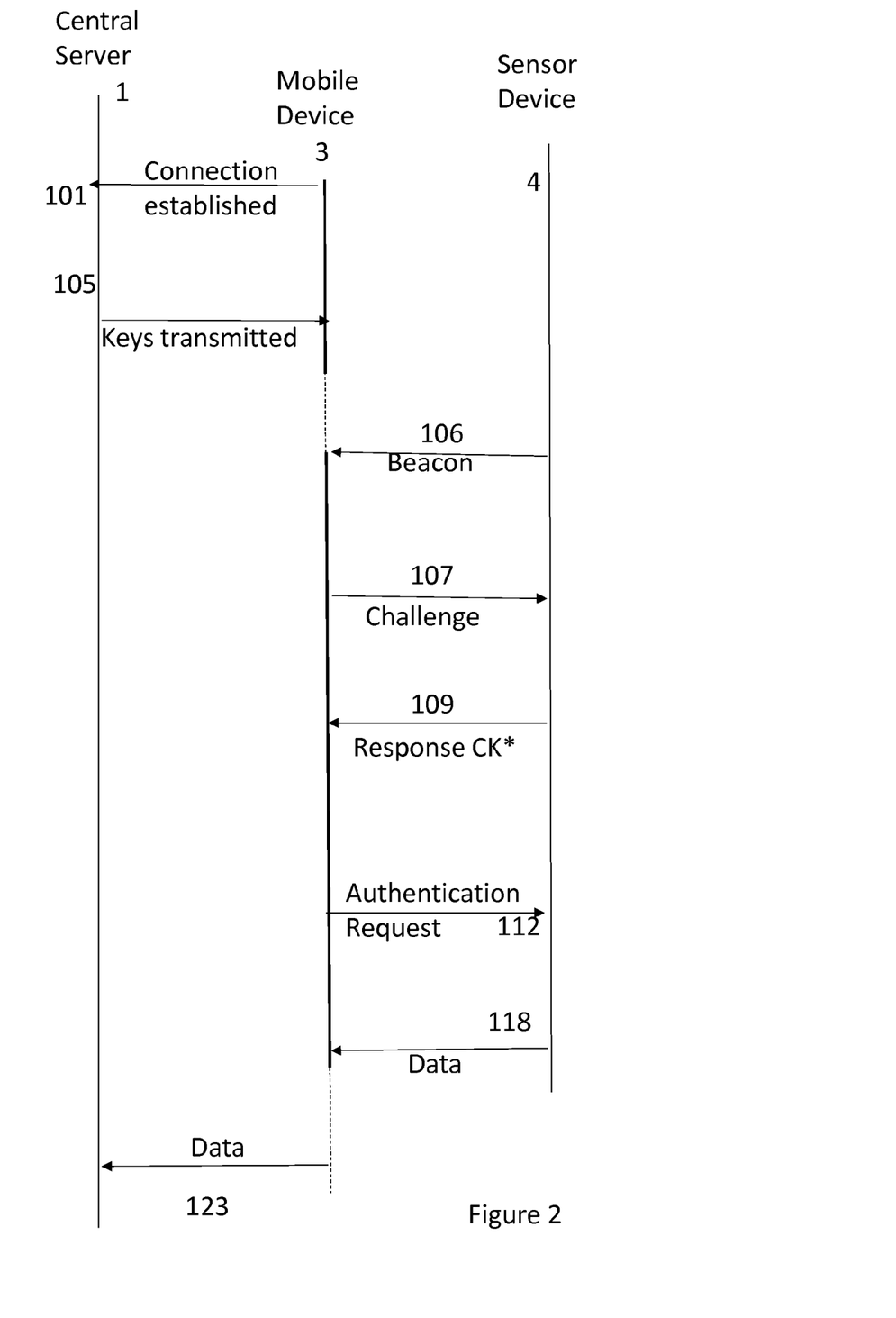
FIG. 2 is a diagrammatic representation of the exchanges of data taking places between the elements co-operating to perform the method of this embodiment
Figure 7:
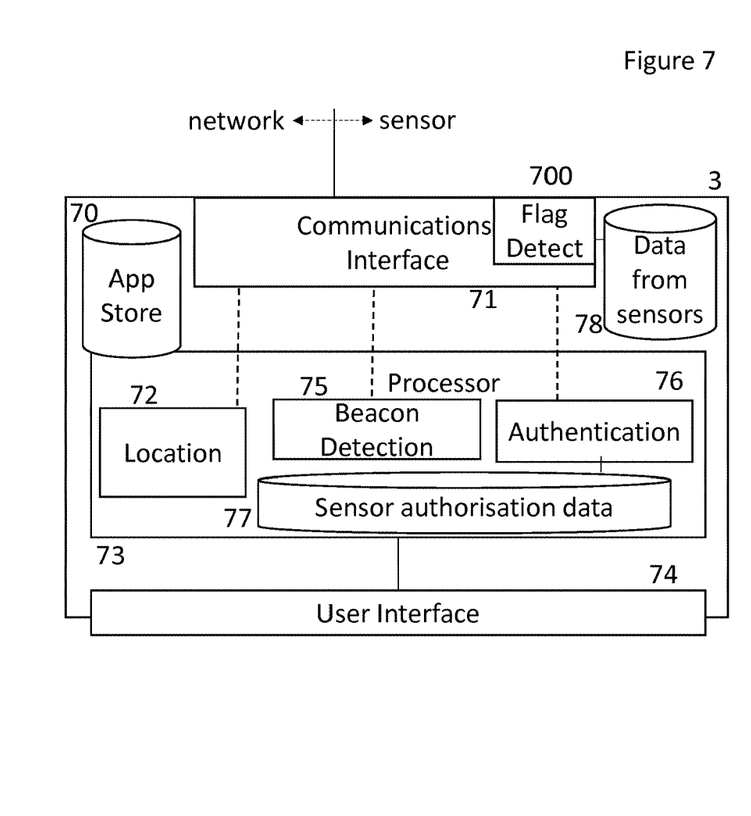
FIG. 7 is a schematic diagram of the functional elements of a mobile device configured for operation according to the invention

As has already been discussed with reference to FIG. 8, each terminal 4 has a beacon generation system 84 for generating a low-powered signal advertising its presence. Referring to FIGS. 1 and 2, if the mobile device 3 comes within range of such a beacon signal (e.g. location 32) the mobile device 3 interrogates the terminal 4 to allow retrieval of data or the distribution of configuration data or software to the terminal. This process is repeated for any other terminal 41 whose beacon it detects (position 33). The data may then be uploaded by the mobile terminal 3 to the central server 1 using the access network 2, 6, The data may be stored in the mobile device 3 at a temporary store 78 (FIG. 7) for transmission to the server 1 at a subsequent time (location 34) if it is impossible or inconvenient to set up a special data session with the access network 2, 6 immediately the data has been collected.

In order to allow mobile devices not under direct control of the operator of the terminals 4, 41 etc, and the central server 1 to be used for this purpose, it is desirable for each of the three elements in the process—that is to say the central server 1, the mobile device 3 and the terminal 4—to be able to authenticate the identities of the other two. This is achieved, in the present embodiment, by the following process. It will be described with reference to a single terminal device 4, but it will be understood that the process will be the same for all the other terminal devices 41, 42, etc.

Each local terminal (LS) has a "shared secret" key (SK), identical copies of which are stored securely in memory in the central server 1 (FIG. 6) and in memory in the terminal 4 (FIG. 8) (both indexed "88" as the data in the memories are identical). It is desirable that each terminal 4, 41, 42 etc has a different "shared secret", each known only to central server 1 and the respective terminal. This secret key can be used to generate encryption key strings without compromising the secret, but the generated key strings can only be decrypted by a device that also has the shared secret. It is desirable that the secret is derived from an algorithm such as Time-based One-time Password Algorithm (TOTP), that computes a one-time password from the shared secret key and the current time and/or a counter, to generate a hash-based message authentication code (HMAC), such that it changes with each use in a quasi-random manner, to ensure that any user intercepting communications using the key cannot use the intercepted communication as a model for a rogue communication emulating the genuine originator of the original message.

The authentication process will be described with reference to FIGS. 1 to 5. There are two principal stages to the process. The first stage, (Steps 100-105) takes place in response to a mobile device 3 moving to a location 31 within an area 5 where there are terminals 4, 41, etc to be detected. In this stage, the mobile device is given information to allow it to identify the terminals and perform a mutual authentication with them The second stage (steps 106-123) takes place in response to the mobile device, having moved to a location 32, 33 in which it detects the beacon of one of the terminals 4, 41 etc), and can carry out the authentication process for which it was given the necessary data in the first stage.

The process operates as follows. The mobile unit 3 is configured to report to the central server 1 when its location-finding system 72 detects that it has entered a region 5 where terminals 4, 41 etc under the indirect control of the server are located. This may be done by having the mobile device 3 periodically reporting its position to the server 1, and the server responding when the reported location meets predetermined criteria. Alternatively, the position-based criteria can be pre-loaded in the programming 70 of the mobile device, so that when the location system 72 detects that its location is within a region 5, it automatically reports to the central server 1.

When the mobile unit 3 enters such a predetermined region 5 (step 100) its authentication processor 76 co-operates with the central server 1, and as a first step in the process it requests a "white list" of local terminals (step 101). This request includes the MAC address of the mobile device, and its current location. The use of the MAC address of the data mule when generating a one time or many-time challenge key effectively binds the data mule 3 with the server 1.

The central server 1 retrieves the data relating to the relevant terminals 4, 40, 41 etc from a store 68 and generates a request transaction identity (r_txid) and a challenge transaction identity (c_txid) for each terminal 4, 41, 42 etc in the region 5 (step 102). (Apart from using different secret keys, the process is the same for each terminal and will be described only for terminal 4). The c_txid is a quasi-random string generated using the secret key SK of the terminal 4 and information specific to the device 3 such as such as MAC address, serial number and vendor. The r_txid is another quasi-random string, also generated using the secret key and the device-specific data, and also includes the MAC address of the terminal 4.

The key generation processor 62 then generates a request key (RK) for the terminal, incorporating the r_txid (step 103), and a challenge key (CK) for the terminal incorporating the c_txid (step 104). Each request key is unique and is generated using an encrypted form of the MAC address of the mobile device as one of the parameters, other parameters may include time validity (earliest and latest times), trust level (access control on what the mule can access), number of authentication attempts allowed, and unique transaction identifier. This prevents other devices eavesdropping on exchanges between the mobile device 3 and the terminals 4 and then replaying the exchange substituting their own MAC address. It should be noted that as only the terminal 4 and the central server 1 have access to the "secret key" (SK) 88, no mobile device can generate the encrypted form of the MAC address for itself, nor for any other mobile device it may be attempting to emulate ("spoof").

The keys can be implemented using Keyed Hash Message Authentication Code (HMAC) algorithm such as HMAC-MD5 or HMAC-SHA1. Effectively, the smart phones Bluetooth MAC (comprising 6 bytes) address (and or serial number/vendor) and r_txid can be combined with a shared secret message SK (known only to terminal and central server) into a single plain-text message. The plain message can then be hashed using the SK (known only to terminal and central server) to produce a message digest. This message digest is effectively the RK. Likewise, the CK can be generated in the same way using the c_txid.

The use of transaction identities (txid) is desirable to prevent Man-in-the-Middle attacks, terminal spoofing and replay attacks. In effect, the txids allow the uses of each request key (RK), and challenge key (CK) to be limited in number or period of validity.

Setting up the system to use-keys-only-once would prevent replay attacks by eavesdropping devices, because once authentication has occurred once, the key becomes invalid and no further device listening in would be able to use the same key to gain access. To accomplish this, the terminal 4 and central server 1 maintain previously used r_txids relating to each mobile device in memory 63, 89 for long enough for the threat of immediate "replay" attacks using the same r_txid to have subsided.

Likewise, the terminal 4 can store used c_txids for the mobile device 3 in memory 89, so that it can detect when a "spoofer" device is attempting to replay a previous challenge request.

The central server 1 next transmits a message to the mobile device 3 with the request key RK, challenge key CK, and also incorporating the respective identities r_txid and c_txid (step 105) from which they were generated, for each terminal on the "white list" 68 for the locality identified. The mobile device 3 then stores this data 77 until required. Likewise, terminal-specific configuration data or software could also be sent to the device 3 to allow updates to be made to the terminal.

In one variant, the central server 1 downloads to the terminal 4 a set of one-off RK, CK each with an associated txid, that can be used as a set of one-time "vouchers" to authenticate with the terminal. This allows the mobile device 3 to make multiple contacts with the same terminal 4 without the need to contact the server 1 between each such contact. Essentially, the central server 1 has given the mobile device 3 instructions 77 on how to recognise, and be recognised by, the terminal 4, but without releasing the shared secret stored in the respective memories 88 of the terminal and server by which the recognition signals have been generated. The mobile device 3 (or "mule") only sees the public keys (RK, CK) and does not share the secret which allows such keys to be generated. Furthermore, each key can only be used once, and only by the device having the MAC address encrypted into the key.

The instructions sent by the server 1 provide the data required to allow the mobile device 3 to set up a two-way authentication process between the mobile device 3 and the terminal 4. The set-up process enables the mobile device to issue an initial challenge (Q), recognise the correct response (R) from the terminal, and generate a counter-response (C). The response R is sufficient to prove to the mobile device that the terminal is genuine as only a terminal having the "shared secret" available in its memory 88 can derive response R from challenge Q. The counter-response C is sufficient to prove to the terminal that the device transmitting it is also genuine, as the correct counter-response can only have been generated by the server 1 with the shared secret 88, and thus provides confirmation that the mobile unit has been authorised by the server to receive data from the terminal.

Figure 5:
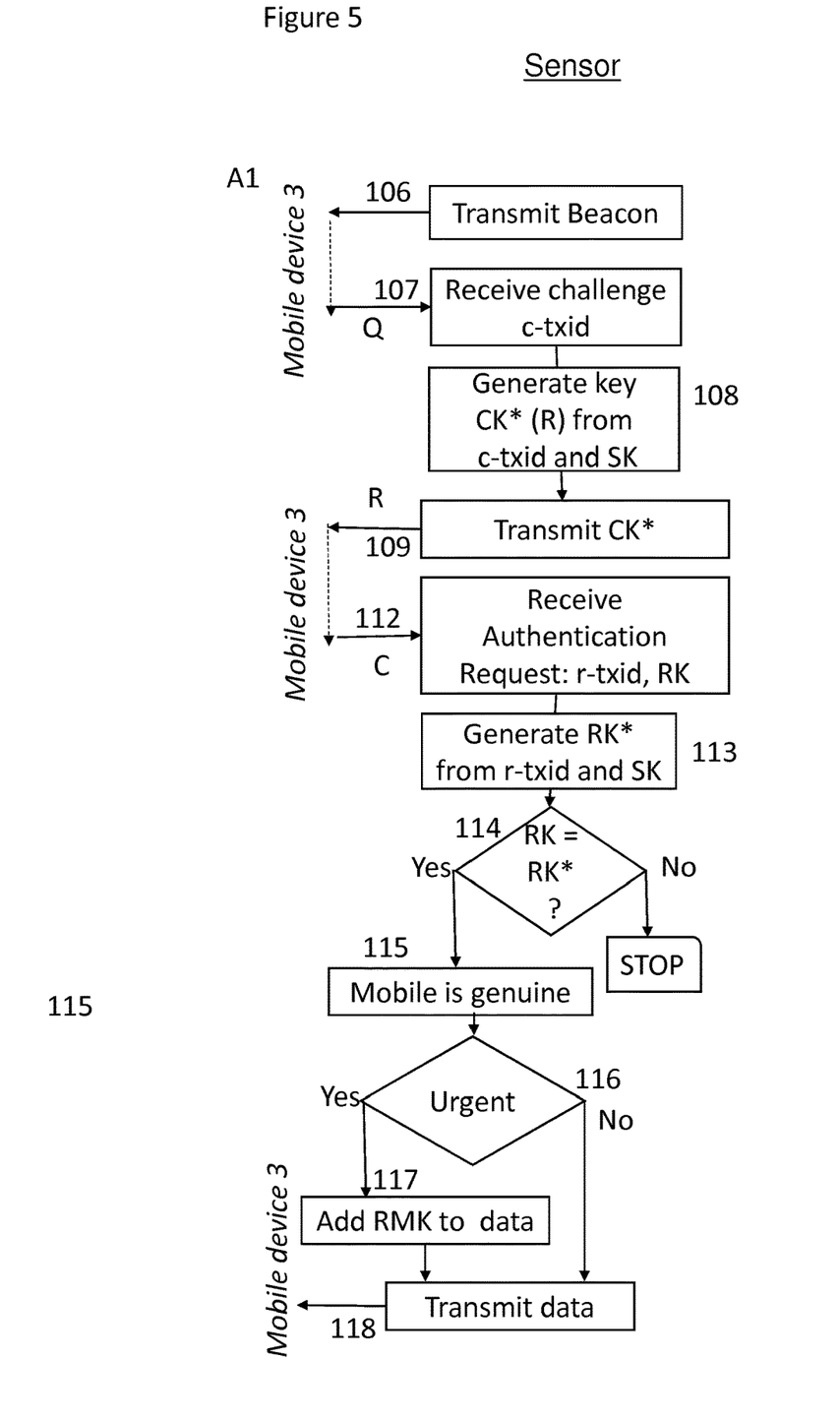
FIG. 5 is a flow chart representing the processes taking place in a remote terminal device operating according to the embodiment.

The use of the challenge Q, response R and counter-response C, will now be discussed with reference to FIGS. 2, 3, and 5 (steps 106-122)

Each terminal 4, 41, etc transmits a beacon signal generated by the beacon generator 84 at low power so that when a mobile device is close to it, communication can be established between the terminal and the mobile device. By using the mobile unit 3 as a relay, the power required for transmission can be much reduced compared with transmission direct to the central server 1 through a "wi fi" hotspot or a cellular base station 2.

When the mobile device 3 approaches a terminal it detects the MAC address of the terminal in its beacon signal 84 (step 106) and pulls the appropriate terminal information from its white list 77. The authentication process 76 in the mobile device 3 generates a challenge request Q (step 107) using the c_txid authorisation data 77 and sends it to the terminal 4.

The authentication processor 85 in the terminal 4 then generates a copy CK* (A1) of the challenge key (step 108), calculated by using the "shared secret" key SK to decrypt the information in the challenge request c_txid received from the mobile device 3. This copy CK* is returned to the mobile device (step 109).

In the next step 110 the authentication processor 76 in the mobile device 3 then compares the challenge key CK* received from the terminal 4 (in step 109) with the challenge key CK previously received from the central server (in step 105) and stored in the memory 77. If CK and CK* correspond then this is proof that the terminal 4 is genuine (step 111), because it shares the secret code SK with the central server 1, as the key CK/CK* can only be derived if the secret code SK is known. It should be noted that the mobile device 3 does not itself have access to the secret code SK, but can determine that both the central server and the terminal can independently derive the code CK/CK*.

Likewise, the authentication processor 76 in the mobile device 3 sends an authentication request to the terminal 4 including the MAC address, and r_txid (step 112). It also sends the request key RK. It should be noted that the value of RK transmitted by the mobile device was generated from the r_txid by the central server 1 using the secret key SK. The mobile device, not having access to the secret key SK, cannot generate the value of the r_txid independently of the server 1. Moreover, as the request key RK also includes the MAC address of the mobile device 3, encrypted using the secret key, other mobile devices cannot stage a "man in the middle" attack on the communications as it does not have access to the key by which the correct MAC address could be substituted by that of the attacking device.

Using the MAC address of the mobile device 3, the r_txid, and the secret key SK, the authentication processor 85 in the terminal 4 determines a value for the request key RK* (step 113). This is compared (step 114) with the value of RK received from the mobile device 3 in the previous step. If the RK received in the authentication request 112 and the locally generated RK* (generated in step 113) match, the terminal can determine that the mobile device 3 is genuine, as the mobile device 3 can only provide the correct value for RK if that value has been generated by the secret code SK, and therefore must have been received from the server 1.

The mobile device 3 and the terminal 4 having each determined that the other is a genuine part of the network under the control of the server 1, communication can be opened between the data store 82 in the terminal 4 and the data store 61 in the server 1, through the mobile device 3 (step 118). Further security for the data itself may be provided by providing an encrypted "tunnel" through the mobile device 3 between the data processing function 83 of the terminal 4 and the corresponding data processing function 66 of the server 1. The data processing encompasses retrieval of terminal data but also the distribution of configuration or update software or data to the terminal. The device acting as "mule" does not need to have access to the encryption system, but is merely the means by which the encrypted data is carried between the terminal and the central server, where it can be decrypted so that the central server 1 can process the data (step 126)

In some cases, the terminal 4 may apply a flag 800 to identify the data (flag RMK, steps 116, 117) as being of high priority, for example to report a failing power supply, loss of the terminal network or a critical value having been detected, requiring immediate upload to the central server 1. The flag RMK can be created using the same key-creation principles as discussed above. If a flag detection unit 700 in the mobile device 3 detects the priority flag RMK (step 119) it establishes a connection with the network immediately (step 120), whereas other data messages may be stored in memory 78 (step 121) until the mobile device 3 next connects to a network for the user's own purposes (step 122).

The application running on the device 3 may face penalties such as connection or data volume charges when using 3G/4G networks. A remuneration system may be provided such that the owner-operator of the mobile device can be compensated for any additional connection charges incurred. To prove the high priority of the request, the high priority flag RMK may thus be forwarded by the mobile device 3 to the central server 1 (step 124) with the data. Detection of this flag may be used by a billing interface 69 to cause the transmission of data to a billing system 67 (step 125) to compensate the user of the terminal 3 for the additional connection required by the data download, for example by crediting the user's account with the cost of the data session.

The invention claimed is:

1. A method for authentication of a communications connection between a server and a remote terminal using an intermediate mobile device, and for transmitting data over an authenticated communications connection between the server and the remote terminal using the intermediate mobile device, the method comprising:

upon the intermediate mobile device entering a region where the remote terminal is located, the intermediate mobile connects to the server;

the server generates first and second key codes, the key codes both being derived from a shared secret known to the server and remote terminal but not to the intermediate mobile device, the server transmits the first and second key codes to the intermediate mobile device, communication is then opened between the remote terminal and the intermediate mobile device, the remote terminal then uses the shared secret to generate a duplicate of the first key code, the remote terminal transmits the duplicate of the first key code to the intermediate mobile device, the intermediate mobile device compares the first key code and the duplicate of the first key code to verify the authenticity of the remote terminal, the intermediate mobile device transmits the second key code to the remote terminal, the remote terminal uses the shared secret to generate a duplicate of the second key code, the remote terminal compares the second key code and the duplicate of the second key code to verify the authenticity of the intermediate mobile device;

after the authenticity of the remote terminal and the authenticity of the intermediate mobile device have been verified, the intermediate mobile device receives data from the remote terminal and stores the data, and subsequently transmits the data to the server when in communication with the server such that the data is transmitted from the remote terminal to the server over the authenticated communications connection between the server and the remote terminal using the intermediate mobile device.

2. A method according to claim 1, in which the first and second key codes are generated from the shared secret, and are changed after each use.

3. A method according to claim 2, in which the server generates a plurality of one-use key code pairs and transmits them to the intermediate mobile device, and the intermediate mobile device uses each key-code pair in turn for a series of authentication interactions with the remote terminal.

4. A method according to claim 1, in which the first and second key codes are combined with encoded address data of the intermediate mobile device, and the remote terminal uses the shared secret to decode the address data, to verify the identity of the intermediate mobile device.

5. A method according to claim 1, wherein the intermediate mobile device is responsive to a flag signal generated by the remote terminal to route the data received from the remote terminal either to a data store in the intermediate mobile device for later transmission to the server, in response to a first setting of the flag signal, or to open a connection to the server for relaying the data to the server in response to a second setting of the flag signal.

6. The method according to claim 1, wherein the intermediate mobile device is a portable smart phone.

7. The method according to claim 1, wherein the intermediate mobile device is a portable smart phone, and the remote terminal includes a sensor configured to record measurements to external stimuli and memory configured to store data corresponding to the measurements for subsequent download.

8. The method according to claim 1, wherein:
the server transmitting the first and second key codes to the intermediate mobile device takes place when the intermediate mobile device is in communication with the server and not with the remote terminal; and
after the server transmitting the first and second key codes to the intermediate mobile device takes place, the intermediate mobile device ceases communication with the server and initiates communication with the remote terminal.

9. The method according to claim 1, wherein the comparison of the first key code and the duplicate of the first key code to verify the authenticity of the remote terminal is performed before the comparison of the second key code and the duplicate of the second key code to verify the authenticity of the intermediate mobile device.

10. The method according to claim 1, wherein:
the remote terminal comprises a sensor and the data that is transmitted from the remote terminal to the server comes from the sensor; and
the data that is transmitted from the remote terminal to the server and that comes from the sensor is vehicular route data or domestic utility data.

11. A mobile data communications device configured to operate as an intermediate relay between a server and one or more remote data communications terminals, having
one or more communications interfaces for communication with the server and the or each remote data communications terminal,
a processing system, including at least one hardware processor, at least configured to:
upon the mobile data communications device entering a region where one or more remote data communications terminals is located, connect the mobile data communications device to the server;
receive challenge and response data from the server relating to the or each remote data communications terminal and comprising, for each remote data communications terminal a first challenge, a first response key and a second response key,
then open communication with the remote data communications terminal,
transmit the first challenge to the respective remote data communications terminal;
receive a version of the first response key from the remote data communications terminal, the version of the first response key having been generated by the remote data communications terminal after the mobile data communications device has opened communication with the remote data communications terminal,
compare the version of the first response key received from the remote data communications terminal with the first response key received from the server to verify authenticity of the remote data communications terminal,
and transmit the second key to the remote data communications terminal for verification of authenticity of the mobile data communications device, and
after the authenticity of the remote data communications terminal and the authenticity of the mobile data communications device have been verified, receiving data from the remote data communications terminal,
storing the received data,
and subsequently transmitting the data to the server when in communications with the server such that the data is transmitted from the remote data communications terminal to the server over an authenticated communications connection between the remote data communications terminal and the server using the mobile data communications device.

12. A mobile data communications device according to claim 11, arranged to transmit a signal reporting its location to the server.

13. A mobile data communication device according to claim 11, wherein the processing system is further configured to detect the or each remote data communications terminal and transmitting the respective challenge and response data in response to such detection.

14. A mobile data communications device according to claim 11, having a memory for storing a sequence of first and second key codes for the or each remote data communications terminal, the processing system being arranged to retrieve each key code in sequence for a plurality of successive connections to the remote data communications terminal.

15. A mobile data communications device according to claim 11, in which the processing system generates the challenge request by using the key code to encode an identity code associated with the device.

16. A mobile data communications device according to claim 11, wherein the communications interface comprises a data store for the data received from the remote data communications terminal, and a detection device responsive to a flag signal carried in data received from the remote data communications terminal to route the received data to the data store in response to a first setting of the flag signal or to the server in response to a second setting of the flag signal.

17. The mobile data communications device according to claim 11, wherein the mobile data communications device is a portable smart phone.

18. The mobile data communications device according to claim 11, wherein,
receiving the data from the server by the mobile data communications device takes place when the mobile data communications device is in communication with the server and not with the remote data communications terminal; and
the mobile data communications device is configured to, after receiving the data from the server takes place, cease communication with the server and initiates communication with the remote data communications terminal.

19. The mobile data communications device according to claim 11, wherein verification of authenticity of the remote data communications terminal is performed before verification of authenticity of the mobile data communications device.

20. The mobile data communications device according to claim 11, wherein:
the remote data communications terminal comprises a sensor and the data that is transmitted from the remote data communications terminal to the server comes from the sensor;
the data that is transmitted from the remote data communications terminal to the server and that comes from the sensor is vehicular route data or domestic utility data.

21. A non-transitory machine-readable storage medium storing computer program code to, when loaded into a mobile communications device and executed thereon, configure the mobile communications device to operate as an intermediate relay between a server and one or more remote data communications terminals such that the intermediate relay is at least configured to:
upon the mobile communications device entering a region where one or more remote data communications terminals is located, connect the mobile communications device to server;
communicate with the server and the or each remote data communications terminal;
receive challenge and response data from the server relating to the or each remote data communications terminal and comprising, for each remote data communications terminal a first challenge, a first response key and a second response key;
then open communication between a remote data communications terminal and the mobile communications device,
transmit the first challenge to the respective remote data communications terminal;
receive a version of the first response key from the remote data communications terminal, the version of the first response key having been generated by the remote data communications after the mobile communications device has opened communication with the remote data communications terminal;
compare the version of the first response key received from the remote data communications terminal with the first response key received from the server to verify authenticity of the remote data communications terminal; and
transmit the second key to the remote data communications terminal for verification of authenticity of the mobile communications device;
after the authenticity of the remote data communications terminal and the authenticity of the mobile communications device have been verified, receive data from the remote data communications terminal, and store the data,
and transmit the data to the server when in communication with the server such that the data is transmitted from the remote data communications terminal to the server over an authenticated communications connection between the remote data communications terminal and the server using the mobile communications device.

22. The non-transitory machine-readable storage medium according to claim 21, wherein the mobile communications device operating as the intermediate relay is a portable smart phone.

23. The non-transitory machine-readable storage medium according to claim 21, wherein the mobile communications device to operating as an intermediate relay is a portable smart phone, and the remote data communications terminal includes a sensor configured to record measurements to external stimuli and memory configured to store data corresponding to the measurements for subsequent download.

24. The non-transitory machine-readable storage medium according to claim 21,
receiving the data from the server by the mobile communications device takes place when the mobile communications device is in communication with the server and not with the remote data communications terminal; and
the mobile communications device is configured to, after receiving the data from the server takes place, cease communication with the server and initiates communication with the remote data communications terminal.

25. The non-transitory machine-readable storage medium according to claim 21, wherein verification of authenticity of the remote data communications terminal is performed before verification of authenticity of the mobile communications device.

26. The non-transitory machine-readable storage medium according to claim 21, wherein:
the remote data communications terminal comprises a sensor and the data that is transmitted from the remote data communications terminal to the server comes from the sensor; and
the data that is transmitted from the remote data communications terminal to the server and that comes from the sensor is vehicular route data or domestic utility data.

* * * * *